(12) United States Patent
Stevens et al.

(10) Patent No.: US 7,505,597 B2
(45) Date of Patent: Mar. 17, 2009

(54) MULTI-LEVEL SECURITY CDMA COMMUNICATIONS ARRANGEMENT

(75) Inventors: Rick C. Stevens, Apple Valley, MN (US); Nagarajan M. Rao, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 862 days.

(21) Appl. No.: 10/802,216

(22) Filed: Mar. 17, 2004

(65) Prior Publication Data
US 2005/0210244 A1 Sep. 22, 2005

(51) Int. Cl.
*H04K 1/00* (2006.01)
(52) U.S. Cl. .................... 380/270; 370/320; 370/335; 370/342; 370/441; 380/247
(58) Field of Classification Search ............... 380/270; 713/166, 176; 398/77, 78; 370/320, 441
See application file for complete search history.

(56) References Cited

U.S. PATENT DOCUMENTS

| | | | | | |
|---|---|---|---|---|---|
| 5,184,347 | A | * | 2/1993 | Farwell et al. .............. | 370/350 |
| 5,761,196 | A | * | 6/1998 | Ayerst et al. ............... | 370/335 |
| 5,860,058 | A | * | 1/1999 | Daniel et al. .............. | 455/12.1 |
| 6,144,654 | A | * | 11/2000 | Ibanez-Meier et al. ...... | 370/342 |
| 6,266,525 | B1 | * | 7/2001 | Peterson ..................... | 455/410 |
| 6,272,168 | B1 | * | 8/2001 | Lomp et al. ................. | 375/222 |
| 6,366,568 | B1 | | 4/2002 | Bolgiano et al. | |
| 6,408,019 | B1 | * | 6/2002 | Pickering et al. ............ | 375/130 |
| 6,498,789 | B1 | * | 12/2002 | Honda ........................ | 370/342 |
| 6,804,207 | B2 | * | 10/2004 | Bolgiano et al. ............ | 370/320 |
| 7,058,077 | B1 | * | 6/2006 | Guo et al. ................... | 370/465 |
| 7,068,617 | B1 | * | 6/2006 | Mahant-Shetti et al. ..... | 370/320 |
| 7,123,590 | B2 | * | 10/2006 | Mir et al. .................... | 370/252 |
| 7,308,250 | B2 | * | 12/2007 | Khare et al. ................ | 455/411 |
| 2005/0041972 | A1 | * | 2/2005 | Kim et al. ................... | 398/78 |

OTHER PUBLICATIONS

Oh et al., "Reliable PN Chip Clock generation for CDMA code Acquistion and tracking", 1997, IEEE.*
Free-Space Optics, FSO History Market Challenges, Retrieved from the internet: http://www.freespaceoptics.org.

* cited by examiner

*Primary Examiner*—Kim Vu
*Assistant Examiner*—April Y Shan
(74) *Attorney, Agent, or Firm*—Crawford Maunu PLLC

(57) ABSTRACT

A communications arrangement that provides multiple levels of security is described. In one embodiment, a plurality of seedable code generators is configured to generate different sets of codes. A plurality of CDMA encoders are respectively coupled to the code generators, and each encodes input data using the set of codes generated by the coupled code generator. A plurality of CDMA decoders are similarly arranged for decoding input data. A node controller provides respective input seeds to the code generators and provides respective sets of codes from the code generators to paired encoders and decoders. An interconnect combines encoded data from the encoders into an output signal and transmits the output signal. An input signal received by the interconnect interface is provided to each decoder.

10 Claims, 6 Drawing Sheets

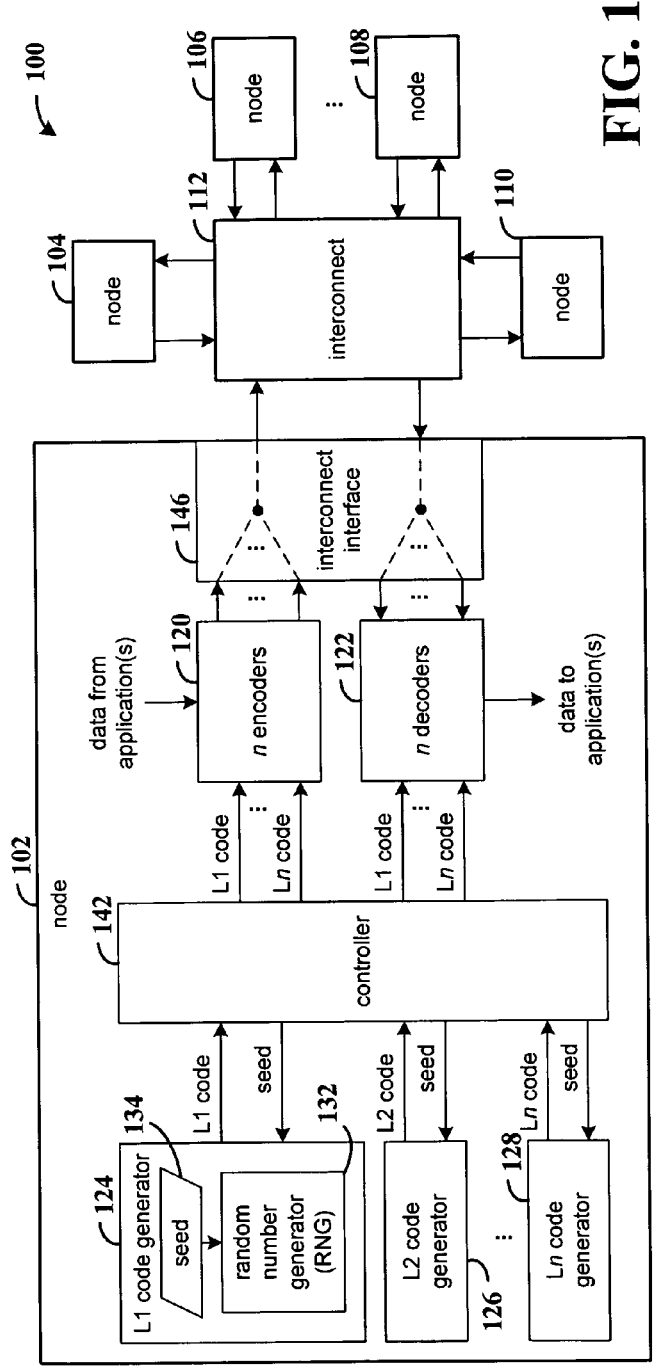
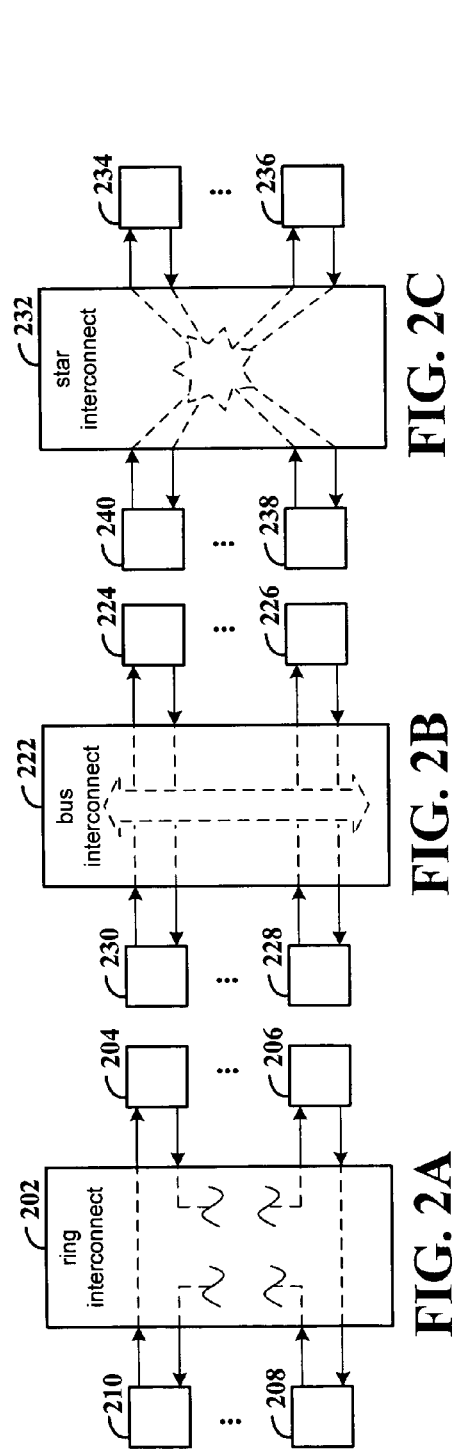
FIG. 1
FIG. 2A
FIG. 2B
FIG. 2C

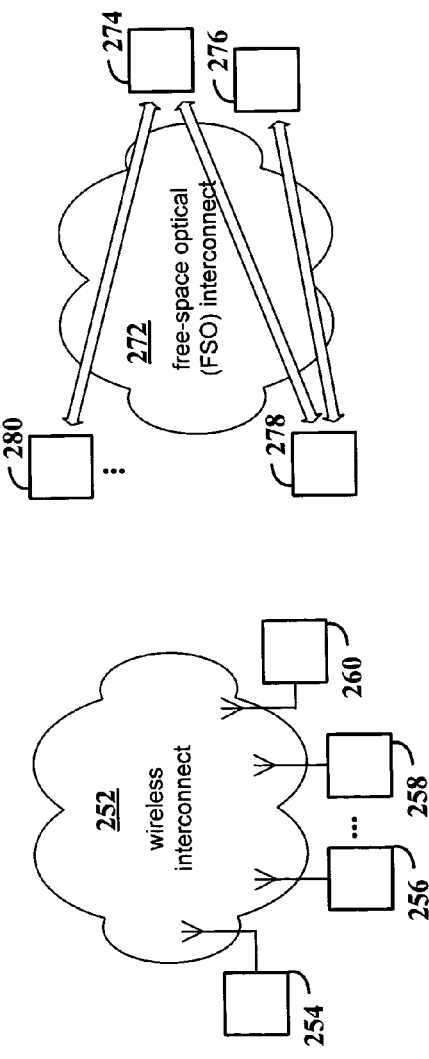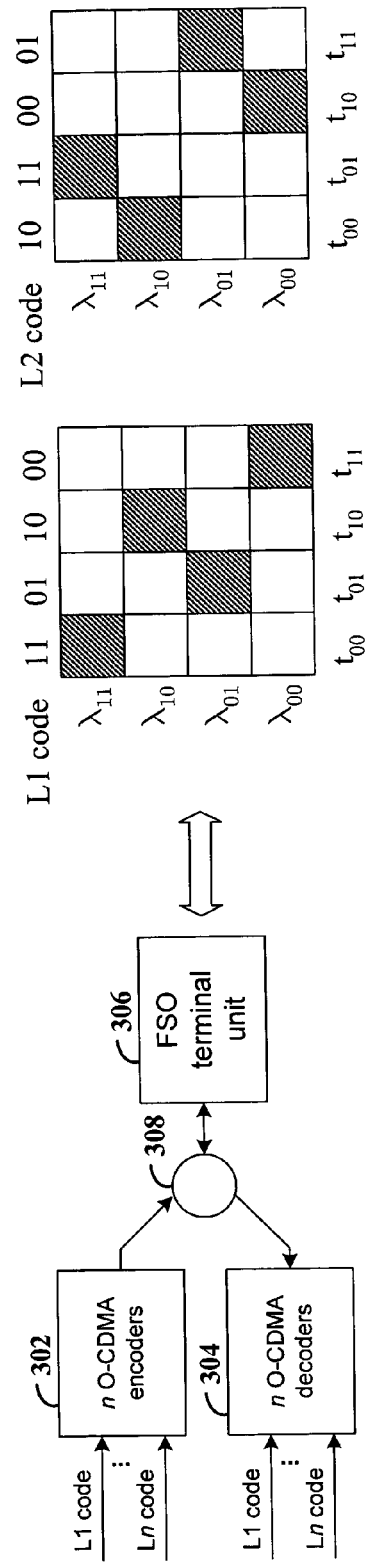

MULTI-LEVEL SECURITY CDMA COMMUNICATIONS ARRANGEMENT

FIELD OF THE INVENTION

The present invention relates in general to Code Division Multiple Access (CDMA) communications techniques.

BACKGROUND

Various applications involving electronic systems require a combination of secure transmissions and high bandwidth in an arrangement that is reasonably affordable. For example, Automatic Target Recognition (ATR) applications may require transmission of a large quantity of data to multiple users. A network of computing nodes may process and exchange information. The transmissions must be reasonably resistant to jamming and interception, covert, and secure from discovery.

ATR-type applications also consume a great deal of bandwidth. For example, image files of many megabytes may require transmission and processing in real time. In addition, transmission of high-resolution imagery files to multiple users or nodes may be required. If too much time or bandwidth is consumed in transmitting data, missions may be jeopardized.

Various types of applications may also require multiple security levels in order to limit access to transmitted data. For example, a certain set of data may be classified within a certain security level and visible only to users having authorization to view data at that security level. Managing and controlling access to data of different security levels may be cumbersome.

The cost of a suitable communications arrangement may also be an important factor. For example, a communications arrangement that is prohibitively expensive may be deployed in a limited way, and a limited deployment may be marginally effective for a particular application. Thus, efforts to control the costs associated with developing, implementing, and deploying electronic system applications must be made.

The present invention may address one or more of these and related issues.

SUMMARY

The various embodiments of the invention provide a communications arrangement having multiple levels of security. In one embodiment, a plurality of seedable code generators is configured to generate different sets of codes. A plurality of CDMA encoders are respectively coupled to the code generators, and each encodes input data using the set of codes generated by the coupled code generator. A plurality of CDMA decoders are similarly arranged for decoding input data. A node controller provides respective input seeds to the code generators and provides respective sets of codes from the code generators to paired encoders and decoders. An interconnect combines encoded data from the encoders into an output signal and transmits the output signal. An input signal received by the interconnect interface is provided to each decoder.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

FIG. 1 is a functional block diagram that illustrates a communications arrangement in accordance with various embodiments of the invention;

FIG. 2A illustrates a ring interconnect;

FIG. 2B illustrates a bus interconnect;

FIG. 2C illustrates a star coupled interconnect;

FIG. 2D illustrates a wireless interconnect;

FIG. 2E illustrates a free-space optical interconnect;

FIG. 3 is a functional block diagram of a subsystem that implements a free-space optical interface for a node in accordance with various embodiments of the invention;

FIG. 4A illustrates a code pattern for a first example security level;

FIG. 4B illustrates a code pattern for a second example security level;

DETAILED DESCRIPTION

Figure 5A:
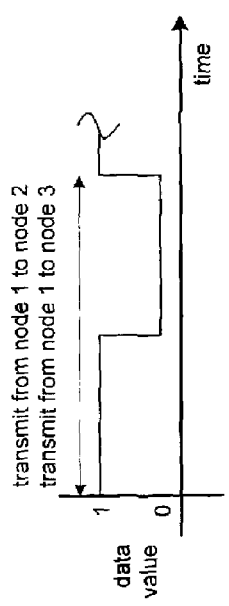
FIG. 5A is a timing diagram that shows an example period in which data is transmitted from a first node to a second node and from the first node to a third node.

In the following description of various example embodiments, reference is made to the accompanying drawings which form a part hereof, and in which is shown by way of illustration various manners in which the invention may be practiced. It will be appreciated that other embodiments may be utilized, as structural and operational changes may be made without departing from the scope of the present invention.

A communication system is disclosed that benefits from the ability to generate unique CDMA codes at various security levels to enable a high performance, multilevel secure interconnect structure. The system provides secure data links for dynamic nodes arranged as a decentralized network. Additionally, this communication system can apply to a variety of physical interconnect topologies and electrical/optical transmission formats.

Each node in the communication network has a predefined number of security levels that may be used for transmitting or receiving data. For each of these security levels there is a unique code generator. The code generators implement a pseudo-random number generator function using an initial seed. All nodes at the same security level use the same initial seed and random number generator. Thus, nodes at the same security level may communicate using the same pseudo-randomly generated CDMA code.

When a particular node wants to communicate with another node at the appropriate security level, a seed for the data transmission is sent from the source node to the destination node using an agreed upon initial code for that security level. The seed is then used by the pseudo-random number generators at the nodes to generate the CDMA encoding/decoding pattern for the data transmission to follow. Multiple security level isolation is maintained over a single, shared interconnect with different pseudo-random number generators at different security levels.

FIG. 1 is a functional block diagram that illustrates a communications arrangement 100 in accordance with various embodiments of the invention. A number of nodes (e.g., 102, 104, 106, 108 and 110) are connected to a physical interconnect 112 that may be based on electrical, radio-frequency, or optical signals. Each node includes at least one CDMA encoder, at least one CDMA decoder, a controller, and at least one code generator for a particular security level. Depending on application requirements, a node may include multiple components for transmitting and receiving over multiple security levels. For example, node 102 includes n encoders 120 and n decoders 122. Correspondingly, there are n code generators 124, 126, and 128, for example. Each code generator corresponds to a specific security level and provides the code used by one pair of the n encoders and decoders.

Each of the code generators uses a pseudo-random number generator (RNG) that is initiated by a selected seed. For example, code generator 124 generates a code for security level, L1, and uses RNG 132, which begins with seed 134. Data passed from an application program at one node to an application in another node is encoded by the sender and decoded by the receiver using codes generated by like code generators. For example, if node 104 were to host an application that communicates at the L1 security level, node 104 would also include a code generator that matches the function of code generator 124 using a like RNG that begins with the same seed. Only the nodes at the appropriate security level (having like code generators and using the same seed) are able to decode this information. This provides security protection during the transmission because other nodes receiving the information and not having the same security level code generator will not be able to decode the information.

In one embodiment, the RNG at a security level is changed with each information transfer. It will be appreciated that the beginning and end of an information transfer may be defined according to the chosen protocol of the application. For example, an information transfer may consist of a single fixed-sized packet of information or may include multiple packets of various sizes in a conversational protocol. Each information transfer may have a minimum of two sub-transactions, one to send the next seed and one to send the actual information. Changing the seed on each information transfer decreases the probability of another node deciphering the code pattern because the seed will be different on every transfer. Controller 142 controls the changing of seeds to the various code generators 124, 126, and 128 and provides the codes for the different security levels to the encoders 120 and decoders 122.

Depending on implementation requirements, the nodes and constituent components may be implemented with various combinations of hardware and software. For example, the RNG, controller, and encoder/decoder functions may be implemented on a circuit board containing an implementation-driven combination of processors, ASICs, or FPGAs, and a node may be a workstation or mobile computing device.

Interconnect interface 146 provides the physical interface between node 102 and the interconnect 112. It will be appreciated that the capabilities and configuration of the interconnect interface depend on the topology of interconnect 112. For example, FIGS. 2A-2E illustrate different interconnect topologies.

FIG. 2A illustrates a ring interconnect 202 where the information is passed using point-to-point interconnects with each node 204, 206, 208, and 210 passing the data to a successive node until the data arrives at the destination node. FIG. 2B illustrates a bus interconnect 222 where all information may be directly sent or received between nodes 224, 226, 228, and 230 from a single ORed interconnect. FIG. 2C illustrates a star coupled interconnect 232 where each transmit signal is combined and the composite signal is distributed to all of the nodes 234, 236, 238, and 240. FIG. 2D illustrates a wireless interconnect 252 in which each of nodes 254, 256, 258, and 260 transmits and receives an encoded RF signal. FIG. 2E illustrates a free-space optical interconnect 272 in which each of nodes 274, 276, 278, and 280 transmit optical signals to destination nodes. In a free-space optical interconnect the node transmitting data must be optically aligned with the node intended to receive the data. To communicate with more than one node, a node needs to either have a transceiver that is re-positionable for line-of-sight transmissions with transceivers of the other nodes or have multiple optical transceivers placed in line-of-sight with the transceivers of the other nodes.

FIG. 3 is a functional block diagram of a subsystem that implements a free-space optical interface for a node in accordance with various embodiments of the invention. The CDMA encoders and CDMA decoders described in FIG. 1 may be alternatively implemented with optical CDMA (OCDMA) encoders and decoders 302 and 304, respectively.

It will be appreciated that CDMA encoders and decoders use RF frequencies and time to implement transmissions codes, whereas OCDMA encoders and decoders use wavelengths of light and time to implement transmission codes. Therefore, within the OCDMA encoders and decoders 302 and 304, respectively, are multi-wavelength optical transmitters and multi-wavelength filters which are time gated (similar to CDMA) to enable optically based transmissions.

The optical media interface 308 combines the optically encoded data from multiple encoders and splits received optical signals as necessary to interface to multiple decoders. Additionally, optical amplification may be used to compensate for high splitting losses. An Optical CDMA (OCDMA) output signal may be optically transmitted by optical fiber or optically transmitted in free space by a free space optics (FSO) terminal unit 306. The FSO terminal unit 306 may contain the necessary equipment to enable an optical line-of-sight (LOS) transmission link between nodes. There are many approaches that could be used to obtain this link, such as using single or multiple lasers, adaptive optics or fast tracking gimbals, open loop RF link aided GPS based pointing and tracking or closed loop autonomous pointing and tracking.

FIGS. 4A and 4B illustrate an example pair of optical code division multi-access (OCDMA) codes that may be used in association with two different security levels. The example codes illustrate how two different OCDMA codes may be used for different security levels and support simultaneous transmission of encoded data on the same interconnect, whether free space optical or fiber guided optical. It will be appreciated that these same concepts may be applied to electrical or RF CDMA implementations.

FIG. 4A illustrates the code pattern for security level, L1. The L1 code pattern is 11011000. At time $t_{00}$ the information is contained in optical wavelength $\lambda_{11}$, at time $t_{01}$ the information is contained in optical wavelength $\lambda_{01}$, at time $t_{10}$ the information is contained in optical wavelength $\lambda_{10}$, and at time $t_{11}$ the information is contained in optical wavelength $\lambda_{00}$.

FIG. 4B illustrates the code pattern for security level, L2. The L2 code pattern is 10110001. At time $t_{00}$ the information is contained in optical wavelength $\lambda_{10}$, at time $t_{01}$ the information is contained in optical wavelength $\lambda_{11}$, at time $t_{10}$ the information is contained in optical wavelength $\lambda_{00}$, and at time $t_{11}$ the information is contained in optical wavelength $\lambda_{01}$. Transmissions using the L1 and L2 codes can coexist because the codes do not use the same optical wavelength at the same time.

Figure 5B:
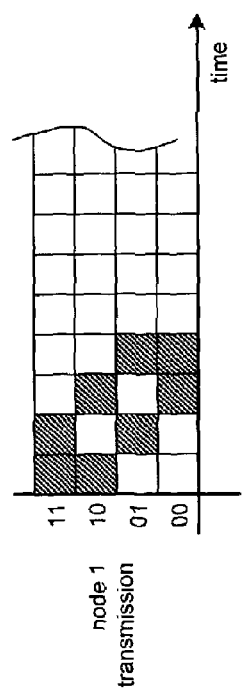
FIG. 5B illustrates the overlay of the example codes from FIG. 4A and FIG. 4B.
Figure 5C:
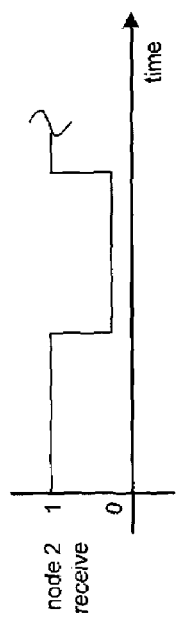
FIGS. 5C and 5D illustrate the period in which data is received by the second and third nodes referenced in FIG. 5A.
Figure 5D:
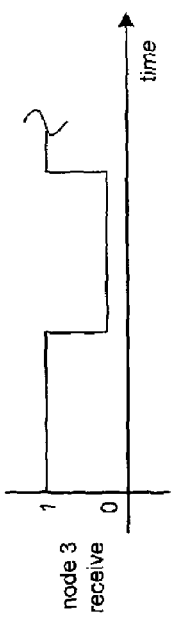

FIGS. 5A-D continue the example of FIGS. 4A and 4B and show how one node (node 1) can simultaneously transmit to both node 2 and node 3 using the same interconnect. FIG. 5A is a timing diagram that shows a period in which data is transmitted from node 1 to node 2 and from a node 1 to node 3. FIG. 5B illustrates the overlay of the example codes from FIG. 4A and FIG. 4B. The timeslots in FIG. 5B are aligned with the transmission period of FIG. 5A. FIGS. 5C and 5D illustrate the period in which data is received by nodes 2 and 3, respectively. It will be appreciated that nodes 2 and 3 are respectively configured to use the corresponding codes from FIGS. 4A and 4B for decoding the received data.

Figure 6:
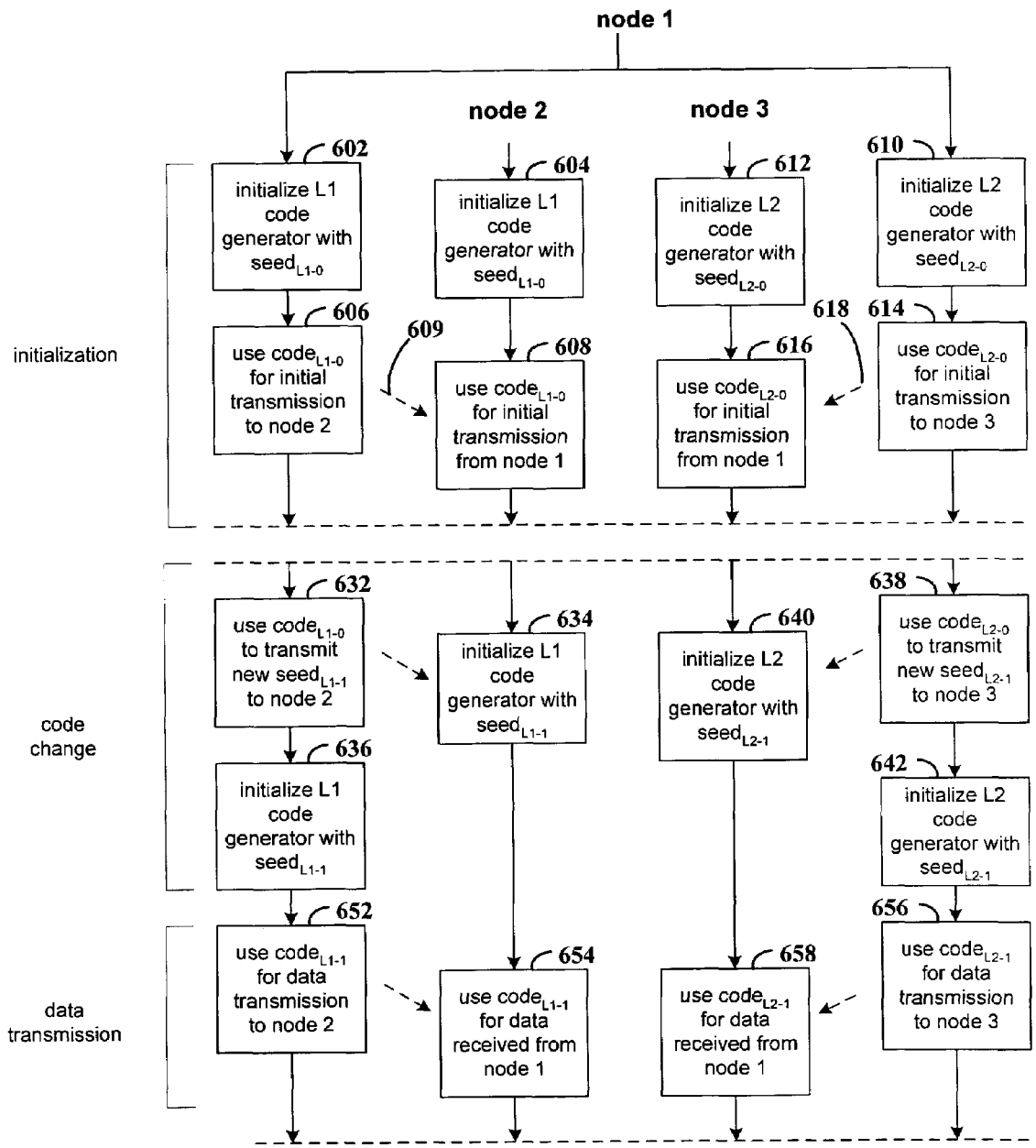
FIG. 6 is a flow diagram that shows operations of the first, second, and third nodes in initializing and changing seeds that are used to generate codes used in encoding and decoding.

FIG. 6 is a flow diagram that shows operations of the first, second, and third nodes in initializing and changing seeds that are used to generate codes used in encoding and decoding. During initialization both nodes 1 and 2 initialize (blocks 602 and 604) with a common seed (seed$_{L1-0}$). This results in nodes 1 and 2 using the same initial code (code$_{L1-0}$) for initial transmissions (blocks 606 and 608) between nodes 1 and 2 at security level 1. Line 609 illustrates a transmission from node 1 to node 2. At the same time that one code generator of node 1 and a code generator in node 2 are initializing with seed$_{L1-0}$, a second code generator in node 1 and a code generator in node 3 initialize (blocks 610 and 612) with a seed$_{L2-0}$ for security level 2 transfers. This results in nodes 1 and 3 using the same initial code (code$_{L2-0}$) for initial transmissions (blocks 614 and 616) between nodes 1 and 3 at security level 2. Line 618 illustrates a transmission from node 1 to node 3. The initial transmissions between node 1 and node 2 and between node 1 and node 3 may be limited to determining whether the nodes successfully initialized and are capable of further communications. Thereafter, the seeds may be changed to enhance security.

Because it may be preferable for security purposes to change the seeds used for code generation, the seeds may be changed from the initialization seeds before transmitting sensitive information. This may be especially true, if a common non-secure code was used to begin initialization. In changing the code used in encoding/decoding, node 1 transmits a new seed (seed$_{L1-1}$) to node 2 using the initial code$_{L1-0}$ to encode the seed (block 632). Node 2 uses code$_{L1-0}$ to decode the new seed and initializes using the new seed$_{L1-1}$ (block 634). Likewise, node 1 initializes with the new seed$_{L1-1}$ (block 636). A similar code change occurs with the code generators used for transmissions between node 1 and node 3 as shown by blocks 638, 640, and 642. After both node 1 and node 2 have initialized with the new seed$_{L1-1}$, transmissions may commence using code$_{L1-1}$ (blocks 652 and 654). Similarly, after both nodes 1 and 3 have initialized with the new seed$_{L2-1}$, transmissions may commence using code$_{L2-1}$ (blocks 656 and 658).

In one embodiment, the sending and receiving nodes may have an agreed upon sequence of data that indicates a seed change is forthcoming. In an alternative embodiment, the sender and receiver may operate on fixed length data packets; the sender may be configured to change the seed before a new packet is sent, and the receiver may be configured to expect a seed change after having received a packet.

Figure 7:
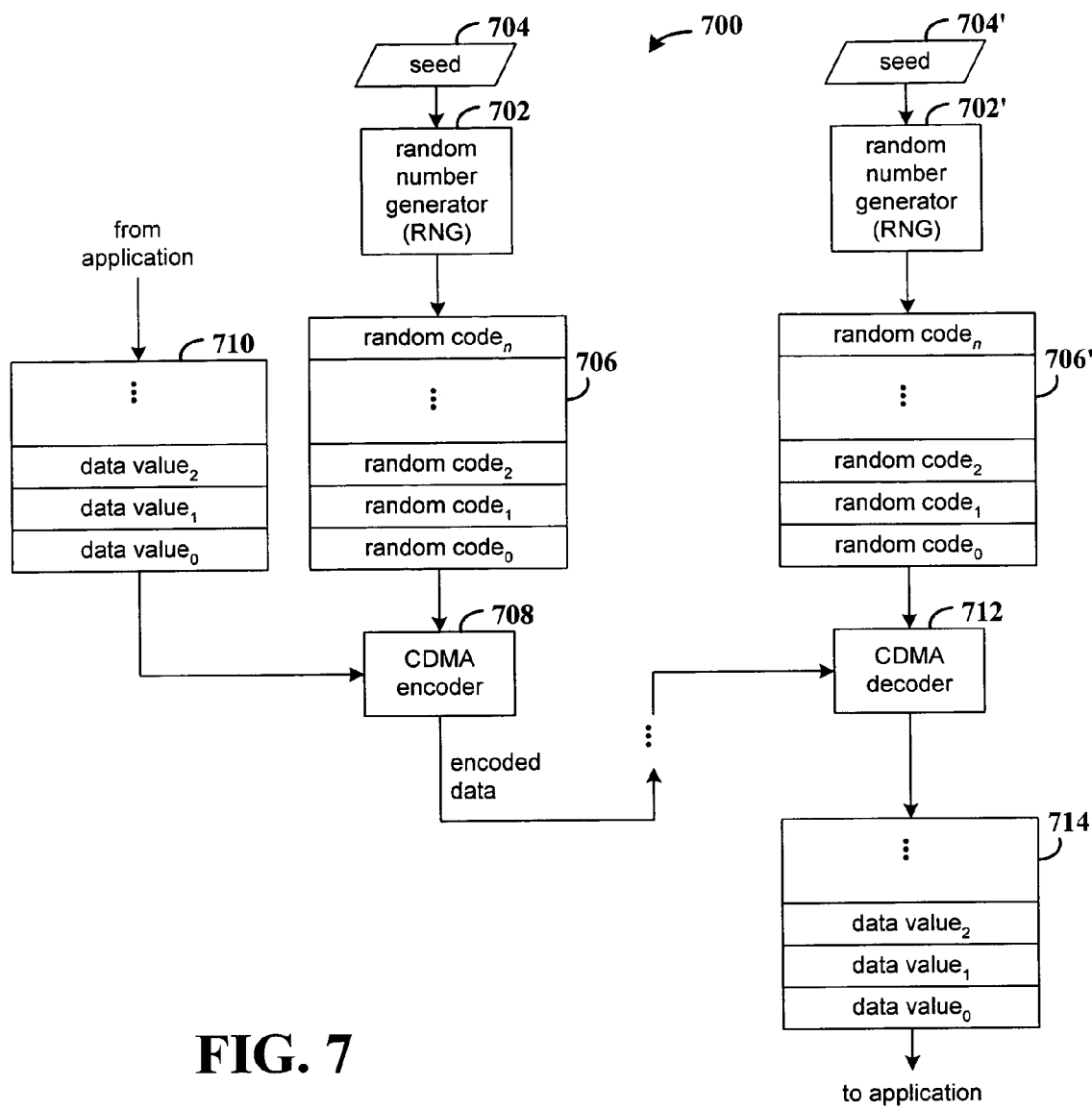
FIG. 7 is a block diagram that illustrates functional components and operation of an encoding and decoding arrangement in accordance with one embodiment of the invention.
Figure 8:
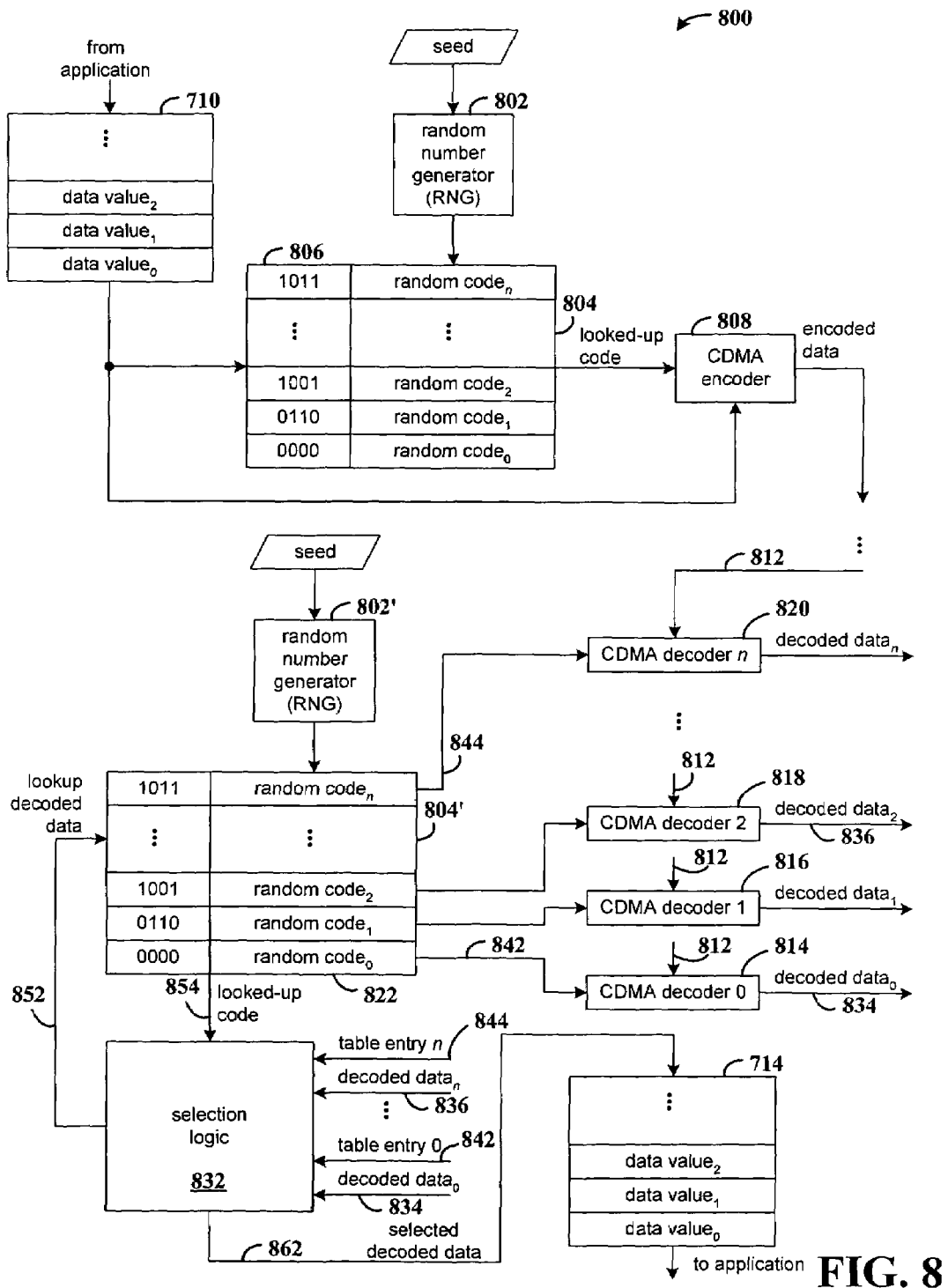
FIG. 8 is a block diagram of an encoding and decoding arrangement in accordance with various other embodiments of the invention.

The decoding and encoding arrangement illustrated in the node 102 of FIG. 1 may be implemented in alternative embodiments to address different security requirements. FIG. 7 illustrates one embodiment of an arrangement for a basic level of security, and FIG. 8 illustrates an embodiment that provides a greater level of security. FIG. 7 is a block diagram that illustrates functional components and operation of an encoding and decoding arrangement 700 in accordance with one embodiment of the invention.

In one embodiment, RNG 702 may be implemented with a Linear Feedback Shift Register (LFSR). The LFSR begins with an initial seed 704 and generates a sequence of pseudo-random codes that are used for encoding data from an application. The pseudo-random codes are stored in First In First Out (FIFO) buffer 706 and provided in order to encoder 708. Data values from the application are stored in FIFO buffer 710 and input to encoder 708 for encoding.

The encoded data is then transmitted to the intended destination node, which has RNG 702' that generates a sequence of pseudo-random codes that are identical to those generated by RNG 702. RNG 702' begins with seed 704', which is the same as seed 704, and the code values are stored in FIFO buffer 706'. The decoder 712 applies the codes from FIFO buffer 706' to the encoded data, and the decoded data values are output in buffer 714. It will be appreciated that within the same node, an encoder-decoder pair may operate from the same random code FIFO, e.g., 706.

FIG. 8 is a block diagram of an encoding and decoding arrangement 800 in accordance with various other embodiments of the invention. The RNGs 802 and 802' used in the approach of FIG. 8 are comparable to those described in the approach shown in FIG. 7. However, instead of sequentially using the generated codes as shown in FIG. 7, the codes are shifted in FIFO order through a cipher translation table 804, and the data value to be encoded is used to lookup the code to be used.

Using the cipher translation table entails a two step encoding/decoding process. The first step is the creation of the table and the second step is the transmission of the data until a pre-determined length when the cipher translation table is regenerated. The possible data values are stored in column 806, and the data value to be encoded is used to read a corresponding code value from the table. For example, if the current data value is 0110, the random code value 1 is selected from the table and used by encoder 808.

In creating table 804, the data values are associated with specific rows in the table, and an initial set of random codes 0-n are stored in entries associated with the data values. When the table is regenerated (at intervals driven by implementation requirements, such as by time or byte count), one or more new random codes may be generated and stored in FIFO order in table 804. For example, if one new random code n+1 is generated, random code 0 is removed from the table, random code 1 becomes associated with data value 0000, random code 2 become associated with data value 0110, random code 3 becomes associated with data value 1001, . . . , and random code n+1 is associated with data value 1011. If multiple new random codes are generated, the current random codes are shifted in FIFO order in the table by a like number of entries.

The decoder portion of a node includes an array of parallel decoders 814, 816, 818, and 820. For each pseudo-random code entry in the cipher translation table 804', there is a corresponding decoder (CDMA decoders 0-n). The RNG 802' generates pseudo-random codes that are shifted through the code entries in table 804' to build a corresponding cipher translation table on the decoding node. The creation and regeneration of table 804' is synchronized with the creation and regeneration of table 804.

The data to be decoded is input (line 812) to each of the decoders 814, 816, 818, and 820. Each decoder decodes the input data using the random code from an associated one of the entries in the table 804'. For example, decoder 814 uses the random code in entry 822, which has random $code_0$ in the example snapshot of the contents of table 804'. The decoded data values are input to selection logic 832, which determines which decoder correctly decoded the encoded data. For example, decoded data $value_0$ is input to the selection logic 832 on line 834, and decoded data $value_n$ is input to the selection logic on line 836.

The selection logic 832 uses the n decoded data values, the corresponding random codes used by the decoders, and the table 804' to determine which of decoded $data_0$-$data_n$ is correct. For example, the random code provided to decoder 814 on line 842 is also provided to the selection logic to correspond to the decoded $data_0$. Similarly, the random code provided to decoder 820 on line 844 is also provided to the selection logic to correspond to the decoded $data_n$. The selection logic uses each decoded data value to look up a random code in table 804'. Thus, table 804' functions as a look-up table with the input value provided on line 852, and the corresponding random code output on line 854. For each decoded data value, the selection logic compares the looked-up random code (line 854) to the random code used in generating the decoded data value. If the random codes are equal, then the decoded data value is the correct one of the n data values to output (line 862). For example, if decoded $data_0$ is used to lookup a random code from table 804', and the looked-up code (line 854) is equal to the random code used to generate the decoded data value (i.e., the code from table entry 822 that is provided on line 842 to decoder 814 and to the selection logic), then decoded $data_0$ is the value selected for output. It will be appreciated that the arrangements 700 and 800 may have multiple instances of the illustrated logic for simultaneous transactions onto or from a single CDMA transmission. Additionally, the controller may monitor any common command/control channels used for delivering initial seeds and for diagnostics.

It will be appreciated that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A node configured for communications at multiple levels of security, comprising:
   a plurality of seedable code generators, wherein each code generator is configured to generate a different set of codes;
   a plurality of CDMA encoders respectively coupled to the code generators, wherein each CDMA encoder encodes input data using the set of codes generated by the coupled code generator;
   a plurality of CDMA decoders respectively coupled to each code generator, wherein each CDMA decoder decodes input data using the set of codes generated by the coupled code generator;
   a node controller coupled to the plurality of encoders, decoders, and code generators, the controller arranged to provide respective input seeds to the code generators, and to provide respective sets of codes from the code generators to paired encoders and decoders;
   wherein the controller is further configured to initialize the code generators with respective first seeds and reset each code generator with respective second seeds; and
   an interconnect interface coupled to the plurality of encoders and decoders, the interconnect interface arranged to combine encoded data from the encoders into an output signal and transmit the output signal, and for an input signal received by the interconnect interface provide the input signal to each decoder;
   wherein each of the plurality of decoders includes an associated set of sub-decoders having respective input ports arranged to receive input encoded data and respective output ports arranged to output decoded data values; and
   the controller includes,
      a first cipher translation table having a first input port coupled to one of the plurality of code generators, a second input port arranged to receive an input data value, and an output port coupled to one of the plurality of encoders, the first cipher translation table configured with data values and associated random codes generated by the one code generator, wherein the first cipher translation table outputs the random code associated with and responsive to an input data value; and
      a second cipher translation table configured with data values and associated random codes identical to the first cipher translation table, the second cipher translation table including a first input port arranged to receive an input data value, wherein the second cipher translation table outputs the random code associated with and responsive to an input data value via a first output port and provides the each random code to a respective one of the sub-decoders;
      data selection logic having a first plurality of input ports coupled to the sub-decoders, a second plurality of input ports arranged to receive respective random codes from the second cipher translation table, a code input port coupled to the first output port of the second cipher translation table, and an output port arranged to output a selected decoded data value, wherein the selection logic is arranged to select one of the decoded data values responsive to a match of an associated random code used by a sub-decoder in generating the decoded data value and a random code received on the code input port from the second cipher translation table upon input of the decoded data value at the first input port; and
   wherein the controller maintains the first and second cipher translation tables as first-in-first-out (FIFO) buffers of random codes.

2. The node of claim 1, wherein the controller is further configured to reset a code generator with a second seed responsive to receipt of the second seed via the interconnect interface and the decoder coupled to the code generator.

3. The node of claim 1, wherein the controller is further configured to provide a second seed to an encoder for encoding with a previous seed and reset the code generator coupled to the encoder with the second seed.

4. The node of claim 1, wherein the interconnect interface is compatible with a ring interconnect.

5. The node of claim 1, wherein the interconnect interface is compatible with a bus interconnect.

6. The node of claim 1, wherein the interconnect interface is compatible with a star interconnect.

7. The node of claim 1, wherein the interconnect interface is compatible with a radio-frequency interconnect.

8. The node of claim 1, wherein the interconnect interface is compatible with a free-space optical interconnect.

9. A communications arrangement, comprising:
a plurality of nodes, each node having at least one seedable code generator and at least one node having a plurality of seedable code generators, wherein the code generators of a node are configured to generate different codes, and each code generator of a node has a corresponding code generator in at least one of the other nodes, and corresponding code generators generate equal codes;
each node having a respective CDMA encoder coupled to each code generator of the node, wherein each ODMA encoder encodes input data using the code generated by the coupled code generator;
each node having a respective CDMA decoder coupled to each code generator of the node, wherein each CDMA decoder decodes input data using the code generated by the coupled code generator;
each node having a respective node controller coupled to each encoder, each decoder, and each code generator of the node, the controller configured and arranged to provide an input seed to each code generator, and provide a code from each code generator to an encoder and to a decoder;
wherein each controller is further configured to initialize the coupled code generators with respective first seeds and reset each code generator with respective second seeds; and
each node having a respective interconnect interface coupled to each encoder and decoder of the node, wherein the interconnect interface is configured to combine encoded data from each encoder into an output signal and transmit the output signal, and for an input signal received by the interconnect interface provide the input signal to each decoder of the nodes;
wherein each of the plurality of decoders includes an associated set of sub-decoders having respective input ports arranged to receive input encoded data and respective output ports arranged to output decoded data values; and
each controller including,
a first cipher translation table having a first input port coupled to one of the code generators of a node, a second input port arranged to receive an input data value, and an output port coupled to one of the encoders of the node, the first cipher translation table configured with data values and associated random codes generated by the one code generator, wherein the first cipher translation table outputs the random code associated with and responsive to an input data value; and
a second cipher translation table configured with data values and associated random codes identical to the first cipher translation table, the second cipher translation table including a first input port arranged to receive an input data value, wherein the second cipher translation table outputs the random code associated with and responsive to an input data value via a first output port and provides the each random code to a respective one of the sub-decoders; and
data selection logic having a first plurality of input ports coupled to the sub-decoders, a second plurality of input ports arranged to receive respective random codes from the second cipher translation table, a code input port coupled to the first output port of the second cipher translation table, and an output port arranged to output a selected decoded data value, wherein the selection logic is arranged to select one of the decoded data values responsive to a match of an associated random code used by a sub-decoder in generating the decoded data value and a random code received on the code input port from the second cipher translation table upon input of the decoded data value at the first input port;
wherein the controller maintains the first and second cipher translation tables as first-in-first-out (FIFO) buffers of random codes.

10. A multi-level security communications arrangement for a processing node, comprising:
means for generating a plurality of different sets of codes for respective initial seeds;
a plurality of CDMA encoders, wherein each CDMA encoder encodes input data using a respective one of the plurality of sets of codes;
a plurality of CDMA decoders, wherein each CDMA decoder decodes input data using a respective one of the plurality of sets of codes;
means for providing identical seeds to a paired encoder and decoder;
means for combining encoded data from each encoder into an output signal and transmitting the output signal;
means for providing a received input signal to each decoder; and
means, responsive to a re-initialization event, for providing new identical seeds to each paired encoder and decoder;
wherein each of the plurality of decoders includes an associated set of sub-decoders having respective input ports arranged to receive input encoded data and respective output ports arranged to output decoded data values; and
a first cipher translation table having a first input port for receiving a set of codes, a second input port arranged to receive an input data value, and an output port coupled to one of the plurality of encoders, the first cipher translation table configured with data values and a set of associated codes, wherein the first cipher translation table outputs the code associated with and responsive to an input data value; and
a second cipher translation table configured with data values and an associated set of codes identical to the first cipher translation table, the second cipher translation table including a first input port arranged to receive an input data value, wherein the second cipher translation table outputs the random code associated with and responsive to an input data value via a first output port and provides the each random code to a respective one of the sub-decoders;
data selection logic having a first plurality of input ports coupled to the sub-decoders, a second plurality of input ports arranged to receive respective codes from the second cipher translation table, a code input port coupled to the first output port of the second cipher translation table, and an output port arranged to output a selected decoded data value, wherein the selection logic is arranged to select one of the decoded data values responsive to a match of an associated code used by a sub-decoder in generating the decoded data value and a code received on the code input port from the second cipher translation table upon input of the decoded data value at the first input port; and
means for storing newly generated codes in the first and second cipher translation tables in first-in-first-out (FIFO) order.

* * * * *